US008869097B2

(12) United States Patent
Asadullah et al.

(10) Patent No.: US 8,869,097 B2
(45) Date of Patent: Oct. 21, 2014

(54) ONLINE INTEGRATED DEVELOPMENT ENVIRONMENT WITH CODE ASSIST

(75) Inventors: Allahbaksh Mohammedali Asadullah, Hubli (IN); Susan George, Trivandrum (IN); Basava Raju Muddu, Bangalore (IN)

(73) Assignee: Infosys Limited, Bangalore (IN)

( * ) Notice: Subject to any disclaimer, the term of this patent is extended or adjusted under 35 U.S.C. 154(b) by 89 days.

(21) Appl. No.: 13/070,029

(22) Filed: Mar. 23, 2011

(65) Prior Publication Data

US 2012/0246610 A1 Sep. 27, 2012

(51) Int. Cl.
*G06F 9/44* (2006.01)

(52) U.S. Cl.
CPC .................................. *G06F 8/33* (2013.01)
USPC ........... 717/103; 717/101; 717/102; 717/110; 717/112

(58) Field of Classification Search
None
See application file for complete search history.

(56) References Cited

U.S. PATENT DOCUMENTS

| | | | |
|---|---|---|---|
| 5,640,558 A | 6/1997 | Li | |
| 5,802,334 A | 9/1998 | Nickolas et al. | |
| 5,832,500 A | 11/1998 | Burrows | |
| 6,295,542 B1 | 9/2001 | Corbin | |
| 6,314,559 B1 * | 11/2001 | Sollich | 717/111 |
| 6,381,556 B1 | 4/2002 | Kazemi et al. | |
| 6,643,641 B1 | 11/2003 | Synder | |
| 6,728,752 B1 | 4/2004 | Chen et al. | |
| 6,839,702 B1 | 1/2005 | Patel et al. | |
| 6,976,243 B2 | 12/2005 | Charisius et al. | |
| 6,993,710 B1 | 1/2006 | Coad et al. | |
| 7,137,112 B2 | 11/2006 | Lovvik et al. | |
| 7,313,784 B2 * | 12/2007 | Hawley et al. | 717/110 |
| 7,454,744 B2 | 11/2008 | Bhogal et al. | |
| 7,458,062 B2 * | 11/2008 | Coulthard et al. | 717/121 |
| 7,496,906 B2 * | 2/2009 | Black-Ziegelbein et al. | 717/145 |
| 7,505,964 B2 | 3/2009 | Tong et al. | |
| 7,536,408 B2 | 5/2009 | Patterson | |
| 7,577,939 B2 * | 8/2009 | Bayardo et al. | 717/120 |
| 7,584,453 B2 | 9/2009 | Bayardo, Jr. et al. | |
| 7,594,222 B2 | 9/2009 | Horwitz et al. | |
| 8,091,068 B2 * | 1/2012 | Hawley et al. | 717/110 |
| 8,146,058 B2 | 3/2012 | Sarkar et al. | |
| 8,209,665 B2 | 6/2012 | Rama et al. | |
| 8,296,720 B2 * | 10/2012 | Coulthard et al. | 717/103 |
| 8,386,424 B2 * | 2/2013 | Sharma et al. | 707/610 |

(Continued)

OTHER PUBLICATIONS

Egor Nikitin and Alexander Frank, Microsoft, "Development Environment as a Service", P.com No. IPCOM000145426D, Original Publication Date:Jan. 16, 2007, Copyright 2006 Microsoft.*

Margaret-Anne Storey, et al., University of Victoria, BC, Canada and IBM, Canada, "Improving the Usability of Eclipse for Novice Programmers", Proceeding eclipse '03 Proceedings of the 2003 OOPSLA workshop on eclipse technology eXchange , pp. 35-39, ACM New York, NY, USA © 2003.*

(Continued)

*Primary Examiner* — Don Wong
*Assistant Examiner* — Hossain Morshed
(74) *Attorney, Agent, or Firm* — Klarquist Sparkman, LLP (57) ABSTRACT

An online integrated development environment (IDE) providing code assist is described. A method for providing code assist within the online IDE comprises receiving a request from a client device to access a software development project, storing code assist information related to the software development project, and sending code assist information to the client device. The client device stores the received code assist information and uses it for local code assist operations at the client device. The client device can receive a subset of a database of code assist information stored at a server environment providing the online IDE. The client device accesses the online IDE via a web browser.

17 Claims, 6 Drawing Sheets

(56) References Cited

U.S. PATENT DOCUMENTS

| | | | |
|---|---|---|---|
| 8,392,443 B1* | 3/2013 | Allon et al. | 707/765 |
| 8,566,787 B2 | 10/2013 | Maskeri Rama et al. | |
| 8,566,789 B2* | 10/2013 | Siddaramappa et al. | 717/110 |
| 2004/0194141 A1 | 9/2004 | Sanders | |
| 2004/0267690 A1* | 12/2004 | Bhogal et al. | 707/1 |
| 2005/0097508 A1 | 5/2005 | Jacovi et al. | |
| 2005/0240984 A1* | 10/2005 | Farr et al. | 726/1 |
| 2005/0278695 A1* | 12/2005 | Synovic | 717/112 |
| 2006/0130038 A1* | 6/2006 | Claussen et al. | 717/168 |
| 2006/0293940 A1* | 12/2006 | Tsyganskiy et al. | 705/8 |
| 2007/0050343 A1 | 3/2007 | Siddaramappa et al. | |
| 2007/0061294 A1* | 3/2007 | Parnell et al. | 707/3 |
| 2007/0118542 A1 | 5/2007 | Sweeney | |
| 2007/0250810 A1 | 10/2007 | Tittizer et al. | |
| 2007/0299825 A1 | 12/2007 | Rush et al. | |
| 2008/0086451 A1 | 4/2008 | Torres et al. | |
| 2008/0127034 A1* | 5/2008 | Pasricha et al. | 717/100 |
| 2008/0155508 A1 | 6/2008 | Sarkar et al. | |
| 2008/0243778 A1 | 10/2008 | Behnen et al. | |
| 2008/0301639 A1 | 12/2008 | Bell et al. | |
| 2009/0058847 A1 | 3/2009 | Lewis | |
| 2009/0077091 A1* | 3/2009 | Khen et al. | 707/10 |
| 2009/0119576 A1 | 5/2009 | Pepper et al. | |
| 2009/0178031 A1* | 7/2009 | Zhao | 717/143 |
| 2009/0198689 A1 | 8/2009 | Frazier et al. | |
| 2010/0070949 A1 | 3/2010 | Rama et al. | |
| 2010/0131517 A1 | 5/2010 | Huang et al. | |
| 2010/0306192 A1* | 12/2010 | Kapur et al. | 707/723 |
| 2012/0254162 A1 | 10/2012 | Asadullah et al. | |
| 2012/0254835 A1 | 10/2012 | Muddu et al. | |

OTHER PUBLICATIONS

Nikitin, Title, "Development Environment as a service", IPCom000145426D, Jan. 16, 2007.*
Storey, Title, "Improving the Usability of Eclipse for Novice Programmers", Posted on Jan. 1, 2003 by Chiselgroup.*
Egor Nikitin et al., "Development Environment as a Service", IPCOM000145426D, Jan. 16, 2007.*
CodeRun, "CodeRun Studio: A free, cross-platform browser-based IDE," <http://www.coderun.com/studio/>, 3 pages (accessed Mar. 10, 2011).
Brito E Abreu et al., "A coupling-guided cluster Analysis approach to reengineer the modularity of object-oriented systems," IEEE conference on software maintenance and reengineering, 2000, 10 pages.
Emanuel et al., "Modularity Index Metrics for Java-Based Open Source Software Projects, "International Journal of Advanced Computer Science and Applications, vol. 2, No. 11, 2011, 7 pages.
"360 Search Results Clustering | Serials Solutions" http://www.serialsolutions.com/360-search-results-clustering, visited Mar. 7, 2011, 3 pages.
"iBoogie—MetaSearch Document Clustering Engine and Personalized Search Engines Directory" http://www.iboogie.com/text/about.asp, visited Mar. 7, 2011, 3 pages.
"Information Visualization for Search Interfaces (Ch 10) | Search User Interfaces" from the book "Search User Interfaces," Published by Cambridge University Press, Copyright 2009, http://searchuserinterfaces.com/book/sui_ch10_visualization.html, visited Mar. 7, 2011, 58 pages.
"MOSS Faceted search," msdn archive, Nov. 1, 2010, 2 pages.
"Drupal: Faceted Search,"drupal.org/project/faceted_search, May 19, 2007, 3 pages.
Code Monkey, "Faceted search," ravelry.com, Sep. 2010, 2 pages.
Krugler et al., "Search-driven development: Five reasons why search is your most powerful tool," LinuxWorld.com, Jan. 29, 2007, http://www.networkworld.com/news/2007/012907-search.html, 4 pages.
"The 4 Hidden Costs of Code Maintenance," White Paper at Krugle.com, Sep. 2008, 9 pages.
Carrot2, http://project.carrot2.org/index.html, archived on Mar. 10, 2011, 2 pages.
Codase, http://www.codase.com, Copyright 2009, archived on Mar. 9, 2011, 1 page.
Google code search, http://www.google.com/codesearch, visited Mar. 8, 2011, 3 pages.
Jexamples, http://www.jexamples.com, archived on Mar. 5, 2011, 1 page.
Koders, http://www.koders.com, archived Mar. 9, 2011, 1 page.
Krugle, http://www.krugle.com, archived Mar. 8, 2011, 1 page.
Atkinson et al., "Effective Pattern Matching of Source Code Using Abstract Syntax Patterns," *Software Practice Exper.*, 36:413-447, 2006, 35 pages.
Begel, "Codifier: A Programmer Centric Search User Interface," *Workshop on Human-Computer Interaction and Information Retrieval*, 2007, 2 pages.
Chatterjee et al., "SNIFF: A Search Engine for Java Using Free Form Queries," Proceedings of 12th International Conference on Fundamental approach to Software engineering, 2009, 16 pages.
Devanbu, "Genoa: A Customizable Language and Front End Independent Code Analyzer," *Proceedings of ICSE* (Melborne, Australia), 1992, 11 pages.
Devanbu et al., "Lassie: A Knowledge-Based Software Information System," *12th International Conference on software Engineering*, 1990, 15 pages.
Mandelin et al., "Jungloid Mining: Helping to Navigate the Api Jungle," *Programmable Language Design and Implementation*, 2005, 14 pages.
Stylos et al., "A Web Search Tool for Finding API Components and Examples," IEEE Symposium on VL and HCC, 2006, 8 pages.
Keivanloo et al., "SE-CodeSearch: A Scalable Semantic Web-Based Source Code Search Infrastructure," aseg.cs.concordia.ca, 2010, 5 pages.
Erlikh, Leveraging Legacy System Dollars for E-Business, *IT Pro*, pp. 17-23, May/Jun. 2000.
Grechanik et al., "A Search Engine for Finding Highly Relevant Applications," *Proceedings of 32nd ACM/IEEE International Conference on Software Engineering 2010*, 2010, 10 pages.
Inoue et al. "Ranking Significance of Software Components Based on Use Relations," *IEEE Transactions on Software Engineering*, vol. 31, No. 3, pp. 213-225, Mar. 2005.
Hummel et al., "Code Conjurer: Pulling Resuable Software Out of Thin Air," *IEEE Software*, pp. 45-52, Sep./Oct. 2008.
Maskeri et al. "Mining Business Topics in Source Code Using Latent Dirichlet Allocation," *1st India Software Engineering Conference*, Hyderabad, India, Feb. 19-22, 2008, 8 pages.
Reiss, "Semantics-Based Code Search," *International Conference on Software Engineering*, 2009, 11 pages.
Hoffman et al. "Assieme: Finding and Leveraging Implicit References in a Web Search Interface for Programmers," *Proceedings of the 20th annual ACM symposium on User interface software and technology*, Oct. 7-10, 2007, Newport, Rhode Island, 2007, 10 pages.
Holmes et al., "Using Structural Context to Recommend Source Code Examples," *Proceedings of the 5th International conference on Software Engineering*, May 15-21, 2005, St. Louis, Missouri, 9 pages.
Thummalapenta et al. "PARSEWeb: Programmer Assistant for Reusing Open Source Code on the Web," International conference on Automated Software Engineering, Nov. 4-9, 2007, Atlanta, Georgia 2007, 10 pages.
Sahavechaphan et al., "XSnippet: Mining for Sample Code," *OOPSLA 2006*, 2006, 19 pages.
Bajracharya et al., "Sourcerer: A Search Engine for Open Source Code Supporting Structure Based Search," *Proceedings of 21st conference on Object oriented programming, Systems, Languages and Applications*, Oct. 22-26, 2006, Portland, Oregon, 2 pages.
Henninger, "Supporting the Construction and Evolution of Component Repositories," *International Conference on Software Engineering*, pp. 279-288, 1996.
Sillito et al., "Questions Programmers Ask During Software Evolution Tasks," *Proceedings of the 14th ACM SIGSOFT International Symposium on Foundations of Software Engineering*, Nov. 5-11, 2006, Portland, Oregon, 2006, 11 pages.
Paul et al., "A Framework for Source Code Search Using Program Patterns," *IEEE Trans. Software Engineering*, vol. 20, No. 6, pp. 463-475, Jun. 1994.
Ye et al., "Supporting Reuse by Delivering Task Relevant and Personalized Information," *International Conference on Software Engineering*, Buenos-Aires, Argentina, May 19-25, 2002, 11 pages.

* cited by examiner

ONLINE INTEGRATED DEVELOPMENT ENVIRONMENT WITH CODE ASSIST

BACKGROUND

Developers are increasingly seeking new ways of using the various services available on networks such as the Internet to more quickly and efficiently develop software solutions. Developers commonly utilize integrated development environments (IDEs) to assist with software development. Typically, a software developer will install an integrated development environment on the developer's computer system.

However, using such integrated development environments that are installed on the developer's computer may not be appropriate in all circumstances. For example, an organization with a large number of software developers may have to purchase and provide integrated development environments for each software developer. Each developer's computer may have to be maintained and updated to support the locally-installed integrated development environment. Furthermore, each developer's computer may need specific computing resources (e.g., memory, storage, processing power, operating system software) to support the operation of the locally-installed integrated development environment.

In addition, a locally-installed integrated development environment may limit the ability for local developers to collaborate or share code with other developers (e.g., while working on a large software project). For example, developers may be located in different countries or may be spread across different parts of the world. In such a situation, code sharing and version control can be difficult if the developers are using local integrated development environments (e.g., the developers may need to upload and synchronize code on a daily or nightly basis).

Therefore, there exists ample opportunity for improvement in technologies related to online software development environments.

SUMMARY

A variety of technologies related to providing and using an online integrated development environment with code assist are applied.

For example, a method for providing code assist within an online integrated development environment (IDE) is described. The method comprises receiving a request from a client device to access a software development project within the online IDE. For example, the request to access the software development project can be received by a server environment from the client device using a web browser (e.g., where the client device uses only the web browser to access the online IDE). The method also comprises storing a database of code assist information related to the software development project. For example, the database of code assist information can be stored at the server environment in a database. The method also comprises sending a subset of the database of code assist information to the client device. The client device stores the subset of the database of code assist information and uses it for local code assist operations at the client device.

As another example, a computer system for providing code assist within an online integrated development environment is described. The computer system comprises a processing unit, a memory, and a computer-readable medium storing computer executable instructions implementing the online IDE which, when executed by the computer system, causes the computer system to perform operations comprising receiving, from a client device, a request to access a software development project within the online IDE, where the online IDE is accessed by the client device using only a web browser. The operations further comprise storing a database of code assist information related to the software development project, determining a subset of the database of code assist information based at least in part upon code classes utilized by the software development project, and sending, to the client device, the subset of the database of code assist information, where the subset of the database of code assist information is stored by the client device and used by the client device for local code assist operations at the client device.

As another example, a method for using code assist within an online integrated development environment is described. The method comprises sending, by a client computing device to a server environment, a request to access a software development project within the online IDE, where the online IDE is accessed via a web browser running on the client computing device. The method further comprises receiving, by the client computing device from the server environment, code assist information related to the software development project, storing, by the client computing device in local storage, the received code assist information, and using, by the client computing device, the received and locally-stored code assist information for code assist operations at the client computing device.

The foregoing and other features and advantages of the invention will become more apparent from the following detailed description, which proceeds with reference to the accompanying figures.

DETAILED DESCRIPTION OF EXEMPLARY EMBODIMENTS

The following description is directed to techniques and solutions for providing and using code assist within an online integrated development environment (IDE). The various techniques and solutions can be used in combination or independently. Different embodiments can implement one or more of the described techniques and solutions.

Code assist, a type of code completion, helps the user obtain possible choices for completing a partial code entry in a specific context (e.g., when entering a class name, method name, variable name, etc.), so that the user can choose one of choices (e.g., valid choices which are available to complete the partial entry) to avoid typing the full sequence of characters for the desired code entry.

I. Server Environment Providing Online IDE

In the techniques and solutions described herein, an online integrated development environment (IDE) is provided for developing software online. The online IDE provides functionality similar to a traditional IDE, such as the ability to browse, edit, and compile code. However, the online does not require that any traditional IDE software or tools be installed on the user's computer. Instead, the online IDE is provided as a web application, and a user accesses the online IDE via a web browser using the user's computer (e.g., via the Internet). The online IDE can provide one or more of the following features: create project, create package, and create class, save, compile, code browse, code search, cross navigation, class hierarchy, and method hierarchy.

Because only a web browser is required to access the online IDE, the user can utilize computing devices that would not otherwise support a traditional IDE. For example, the user can utilize a tablet computer or other type of computing device that does not have the computing resources (e.g., computers without a hard drive or a full operating system) to run a traditional IDE that needs to be locally installed on the user's computing device.

Figure 1:
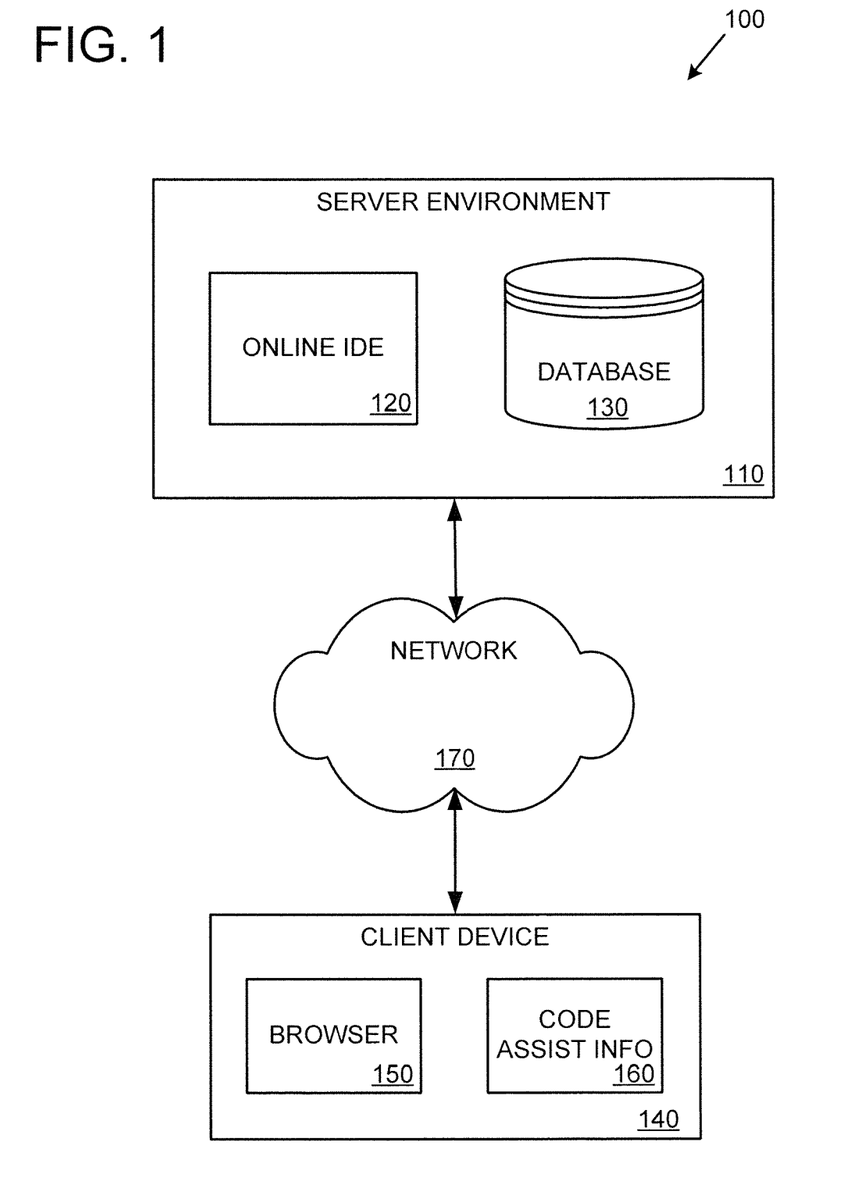
FIG. 1 is a block diagram depicting an example server environment for providing an online IDE.

FIG. 1 is a block diagram 100 depicting an example environment for providing an online IDE to client computing devices (client devices). The environment includes a server environment 110. The server environment 110 includes various hardware and/or software for providing an online IDE 120. For example, the server environment 110 can include web servers, database servers, search servers, and other hardware and/or software resources.

The server environment 110 is connected to a network 170. For example, the network 170 can be a global communication network, such as the Internet. The network 170 can represent various network resources that are needed for end-to-end communication between the server environment 110 and one or more client devices (e.g., client device 140). For example, the network 170 can represent the Internet in combination with other types of networks, such as mobile phone networks (e.g., cell phone networks), Wi-Fi networks, and the like.

The server environment 110 provides the online IDE 120 to client computing devices, such as client computing device 140. Client device 140 comprises a web browser 150 (e.g., Internet Explorer® or Firefox®). In a specific implementation, the client device 140 uses only the web browser 150 (the web browser 150 and associated browser code, scripting code, plug-ins, and the like) to access the online IDE 120 (i.e., the client device 140 does not run any locally-installed IDE software).

The client device 140 also comprises code assist information 160. The code assist information 160 is received from the server environment 110 and stored at the client device 140. In a specific implementation, the code assist information 160 is stored at the client device 140 using HyperText Markup Language version 5 (HTML5) local storage (web storage). The code assist information 160 is used by the client device 140 to perform code assist (code completion) operations while the user of the client device 140 uses the online IDE 120 via the web browser 150.

II. Code Assist Information

In the techniques and solutions described herein, code assist information is used by client computing devices to perform code assist operations. The code assist information is received by a client device from a computer server (e.g., a web server hosting the online IDE). The code assist information is stored at the client device (e.g., via HTML5 local storage as key-value pairs). Alternatively, other local storage solutions can be used to store the code assist information at the client device (e.g., a local database or a custom web browser plug-in).

Code assist information can comprise any type of information that can be used within an online IDE to perform code assist (code completion) operations. For example, code assist information can include variable names, constant names, method names, class names, interface names, and/or parameter names. Code assist information can include information specific to the programming language or languages being used (e.g., Java package, class, or method names).

In a specific implementation, code assist information for an online IDE supporting the Java programming language includes information for class-method mapping, class-variable mapping, jar-package mapping, and package-class mapping. Table 1 below depicts an example table containing code assist information for an example instance of package-class mapping.

TABLE 1

| Package Name | Class Name |
| --- | --- |
| java.lang | SecurityException |
| java.lang | UnicodeBlock |
| java.lang | Character |
| java.lang | Readable |
| java.lang | ProcessBuilder |
| java.lang | String |

Table 2 below depicts an example table containing code assist information for an example instance of class-method mapping.

TABLE 2

| Class Name | Method Name |
| --- | --- |
| SecurityException | SecurityException(string) |
| UnicodeBlock | of(char) |
| String | substring(int) |
| String | subSequence(int, int) |
| Character | charValue( ) |

Other implementations of the code assist information can include programming language information specific to the program language (or languages) used. Code assist information can also include information specific to the programming project being developed by the user. For example, the user developed class, method, variable, and/or parameter names can be included in the code assist information (e.g., separately or along with code assist information specific to the programming language being used). Table 3 below depicts an example table containing code assist information for an example instance of a specific programming project.

TABLE 3

| Class Name | Method Name |
| --- | --- |
| MyClass1 | exampleMethod( ) |
| MyClass1 | anotherMethod( ) |
| MyClass2 | myClassmethod( ) |

Figure 5:
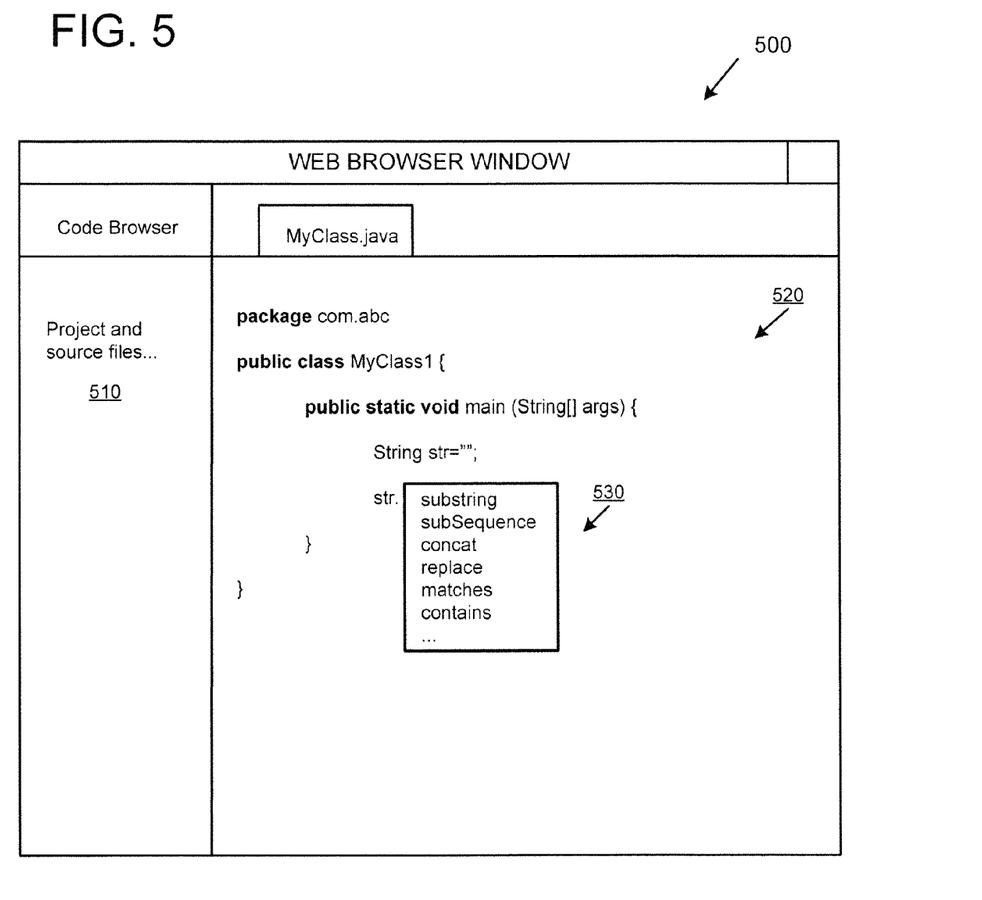
FIG. 5 is a diagram depicting an example web browser interface for performing code assist operations.

FIG. 5 is a diagram depicting an example web browser graphical user interface 500 for performing code assist operations. The web browser interface 500 can be displayed by a client device, such as client device 140.

The web browser interface 500 depicts an example online IDE layout, comprising a listing of project and source files 510 and a code entry area 520. In the web browser interface 500, a user is entering java code defining a java class "MyClass1". As the user is entering code in the code entry area 520, the user types "str." which the assist feature recognizes as a code assist event. In response, code assist options are displayed 530, allowing the user to select one of the options to complete the method name for the String class. In the example depicted in the code entry area 520, the user can select from various code assist options, as displayed at 530. For example, the user can select "substring" to complete the code "str.substring( )".

III. Providing an Online IDE with Code Assist

In the techniques and solutions described herein, code assist solutions are provided within an online integrated development environment (IDE). The online IDE is accessed by client devices using a web browser.

Figure 2:
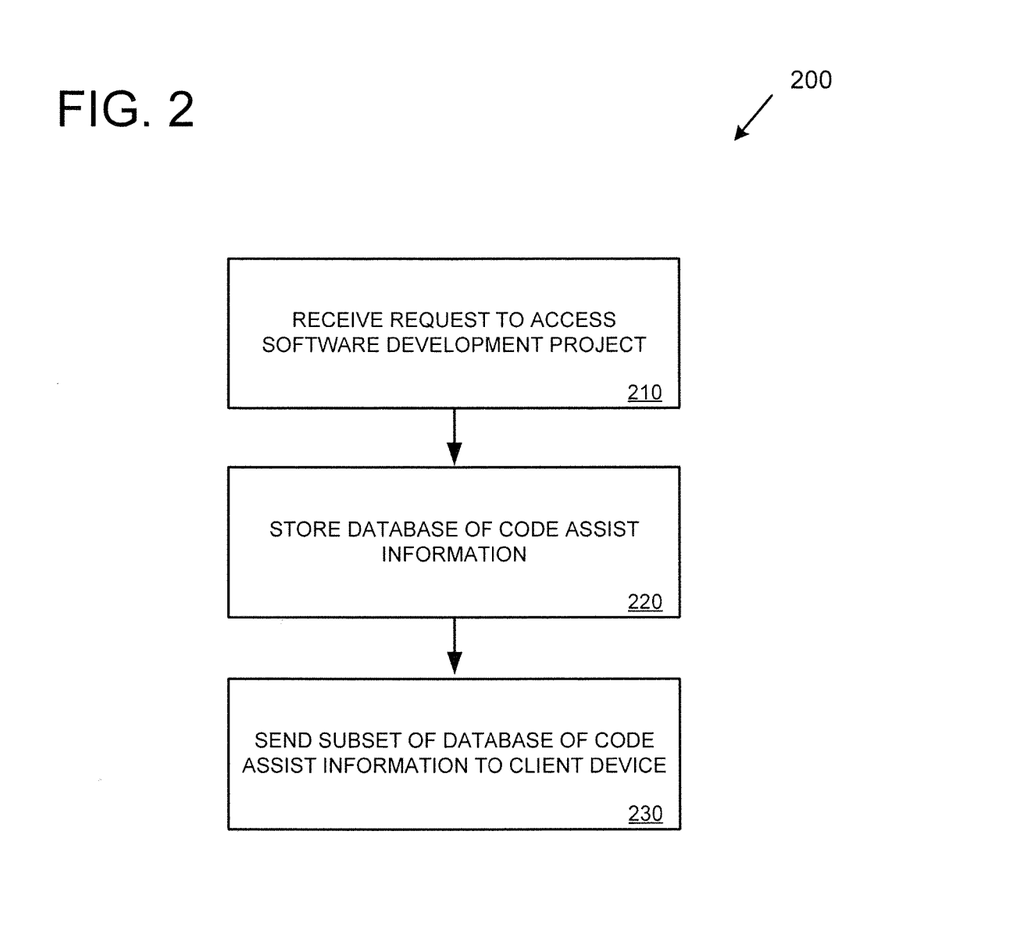
FIG. 2 is a flowchart showing an example method for providing code assist within an online IDE.

FIG. 2 is a flowchart showing an example method 200 for providing code assist within an online integrated development environment (IDE). The online IDE can be provided by a server environment comprising one or more computer servers. For example, the method 200 can be provided by the server environment 110 depicted in FIG. 1.

At 210, a request is received, by a server environment from a client device, to access a software development project within the online IDE. In a specific implementation, the client device accesses the online IDE using only a web browser running on the client device (i.e., there is no other IDE software running on the client device, other than the web code supporting the online IDE running in the web browser of the client device).

At 220, a database of code assist information is stored at the server environment. For example, the database of code assist information can be stored by a web server or a database server associated with the server environment. The code assist information can comprise information related to various programming languages supported by the online IDE (e.g., package, class, and/or method information for Java, C++, C#, etc.). The code assist information can also comprise information related to various software development projects of the users of the online IDE (e.g., code assist information related to custom code, such as classes, methods, variable names, etc.).

At 230, a subset of the database of code assist information is sent to the client device by the server environment. The subset of the database of code assist information is stored by the client device and used by the client device for local code assist operations at the client device. Alternatively, the entire database of code assist information can be sent to the client device. However, sending the entire database may be inefficient (e.g., the current software development project may not utilize a majority of the programming language packages, classes, and methods).

The server environment can select portions of the database of code assist information for sending to the client device based on various factors or criteria. For example, code assist information related to software language packages utilized by the software development project can be selected for sending to the client device. Also, custom code names (e.g., class names, method names, variable names, etc.) used within software code files currently used and/or opened by the user of the client device can be selected for sending to the client device. Selection of code assist information can also be based on other criteria, such as software libraries utilized by a code file or folder of code files currently in use by the user. Desirably, only needed code assist information is sent to the client device (e.g., only code assist information that the user of the client device is likely to encounter when performing code assist operations while the user enters or edits code).

In a specific implementation the server environment determines the subset of the database of code assist information to send to the client device based at least in part upon code classes (e.g., Java code classes) utilized by the software development project.

Because the client device stores the code assist information locally, the client device can perform code assist operations without having to communicate with the server environment. Specifically, code assist operations (for which code assist information is stored locally at the client device) can be completed within the client device web browser without any communication required between the client device and the server environment. For example, the web browser of the client device (e.g., according to code or other instructions running within the web browser), without any interaction with the server environment, can read the locally stored code assist information and display code assist options to a user of the client device as the user enters code (e.g., as displayed in FIG. 5).

If the client device determines that the locally-stored code assist information does not contain the information necessary for a specific code assist operation, the client device can send a request to the server environment for the code assist information, or the client device can perform a code assist operation using the database of code assist information stored at the server environment.

IV. Using Code Assist within an Online IDE

In the techniques and solutions described herein, code assist solutions are used within an online integrated development environment (IDE). The online IDE is accessed by client devices using a web browser.

Figure 3:
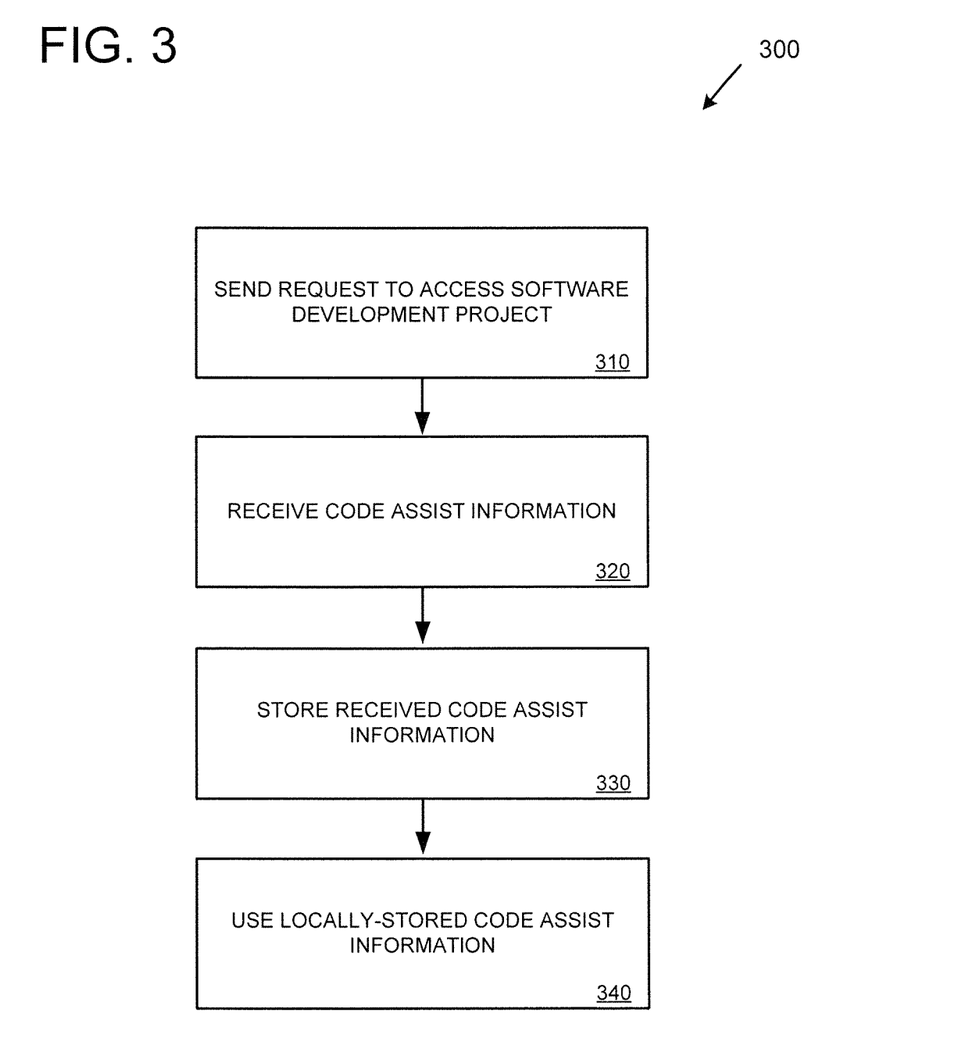
FIG. 3 is a flowchart showing an example method for using code assist within an online IDE.

FIG. 3 is a flowchart showing an example method 300 for using code assist within an online integrated development environment (IDE). The online IDE can be provided by a server environment comprising one or more computer servers and accessed from a client device via a web browser. For example, the method 200 can be used by client device 140 in FIG. 1.

At 310, a client device sends a request to a server environment to access a software development project within the online IDE. In a specific implementation, the client device accesses the online IDE using only a web browser running on the client device (i.e., there is no other IDE software running on the client device, other than the web code supporting the online IDE running in the web browser of the client device).

At 320, code assist information related to the software development project is received by the client device. The code assist information comprises information related to the software development project (e.g., code assist information related to code libraries or packages provided with one or more programming languages in which the software development project is written and/or code assist information related to custom code, such as classes, methods, variable names, etc.).

At 330 the received code assist information is stored by the client device. In a specific implementation, the client device web browser stores the code assist information locally using HTML5 local web storage.

At 340, the locally stored code assist information is used by the client device for code assist operations. For example, the web browser of the client device (e.g., according to code or other instructions running within the web browser) can read the locally stored code assist information and display code assist options to a user of the client device as the user enters code (e.g., as displayed in FIG. 5).

V. Server Environment Detail

In the techniques and solutions described herein, an online integrated development environment (IDE) is provided for developing software online. The online IDE can be provided by various hardware and/or software resources of a server environment. For example, the online IDE can be provided using web servers, database servers, and search servers.

Figure 4:
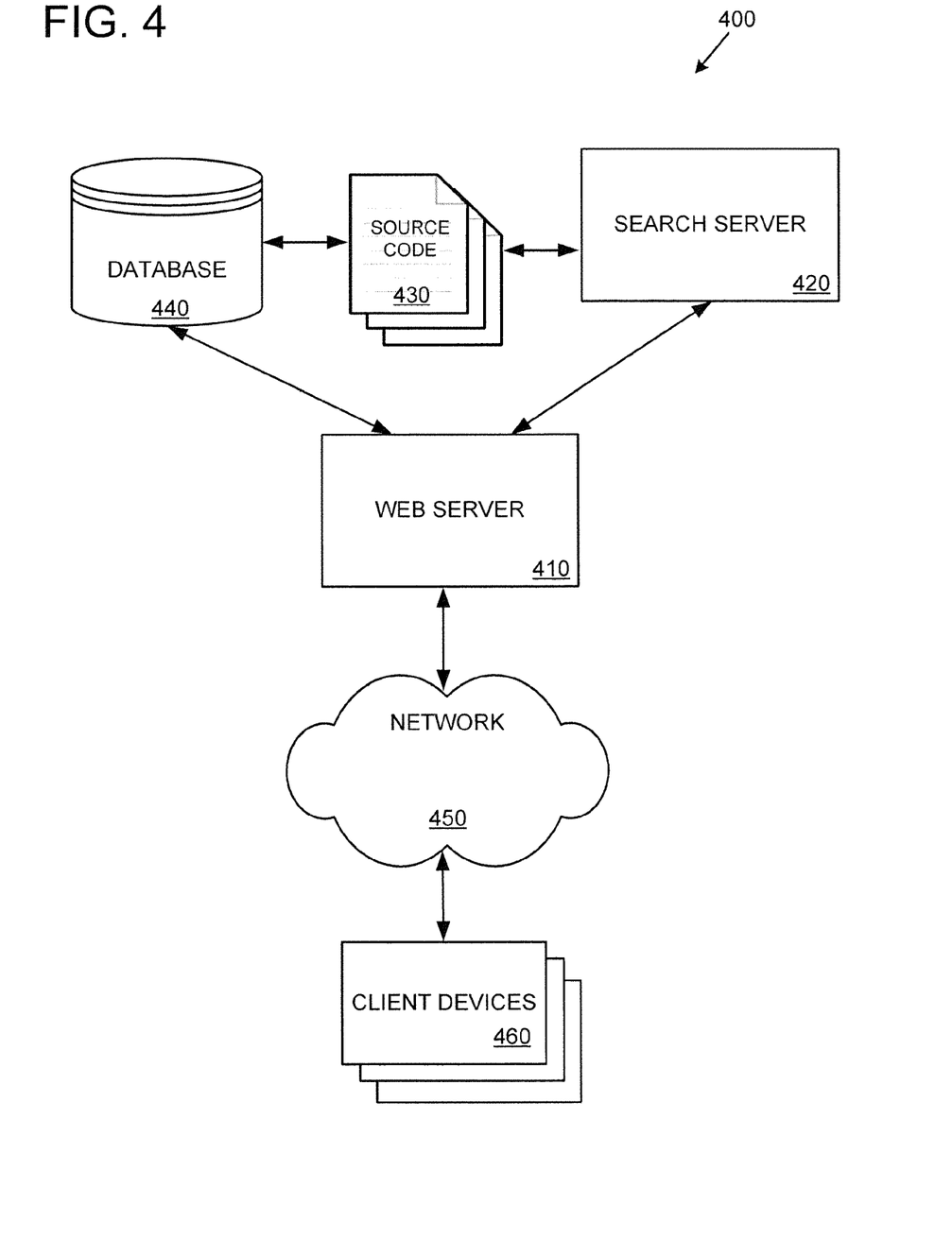
FIG. 4 is a block diagram depicting example server environment detail for providing an online IDE.

FIG. 4 is a block diagram 400 depicting example server environment detail for providing an online IDE to client computing devices. The server-side environment includes a web server 410, a search server 420, a database 440, and source code 430.

The web server 410 is connected to a network 450. For example, the network 450 can be a global communication network, such as the Internet. The network 450 can represent various network resources needed for communication between the web server 410 and one or more client devices (e.g., client devices 460). For example, the network 450 can represent the Internet in combination with other types of networks, such as mobile phone networks (e.g., cell phone networks), Wi-Fi networks, and the like.

The web server 410 provides the online IDE to client devices 460. The client devices 460 access the online IDE via web browsers. In a specific implementation, the client devices 460 use only the web browsers to access the online IDE (i.e., the client devices 460 do not run any IDE software locally, other than code running within the web browsers of the client devices 460). In a specific implementation, the client devices utilize web browser technology including Ajax to access the online IDE, while the online IDE is developed using Google Web Toolkit™ (GWT).

The client devices 460 also receive and locally store code assist information received from the web server 410. The client devices 460 use the received code assist information to perform code assist operations locally at the client devices 460. In a specific implementation, the client devices 460 store the code assist information using HTML5 local web storage and/or SQLite.

In a specific implementation, the database 440 stores the source files and enables versioning of files as the user manages the development projects in the online IDE, and the search server 420 analyzes the source code 430 (e.g., comprising software development projects, code files, and/or programming language libraries), aids in generating code assist information (e.g., package-class name mappings, class-method name mappings, etc.). The web server 410 then accesses the code assist information from the search server 420 to select a subset of code assist information based on the software development project used by a specific client device for sending to the client device. In a specific implementation, the server environment components (e.g., web server 410, search server 420, and database 440) utilize technologies including Apache™ CouchDB™, Apache Commons™ components, Apache Solr™, and Jetty web server.

VI. Example Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 6:
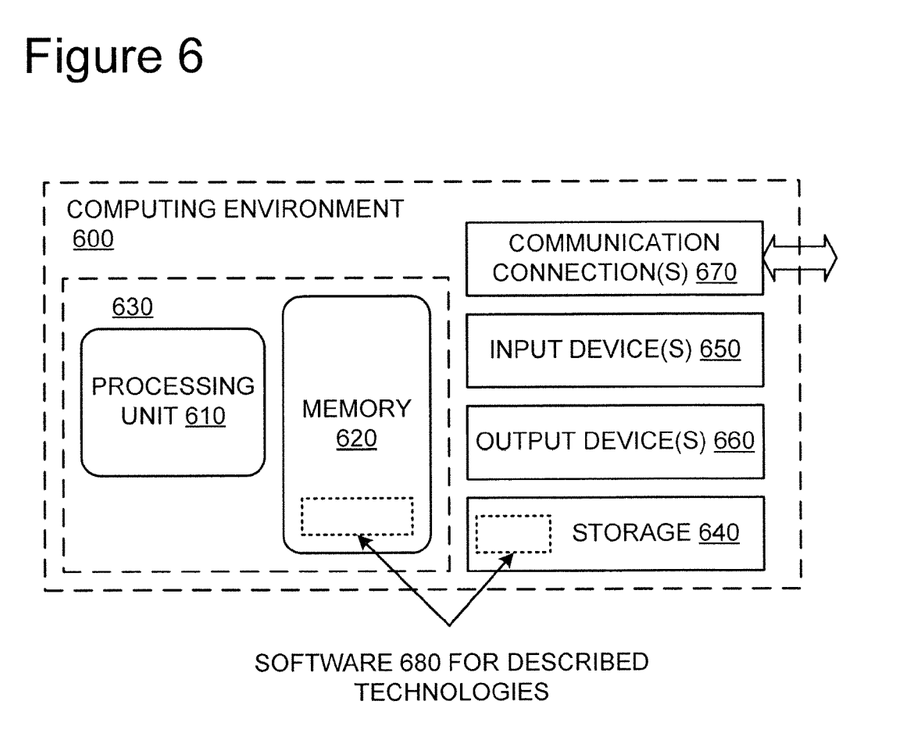
FIG. 6 is a block diagram showing an example computing device.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other tangible storage medium which can be used to store information and which can be accessed within the computing environment 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

VII. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 620 and/or storage 640. As should be readily understood, the term computer-readable media does not include communication connections (e.g., 670) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. I therefore claim as my invention all that comes within the scope and spirit of these claims.

We claim:

1. A method, implemented at least in part by a server environment comprising one or more computer servers, for providing code assist within an online integrated development environment (IDE), the method comprising:

receiving, by the server environment from a client device, a request to access a software development project within the online IDE, wherein the online IDE is accessed by the client device using only a web browser;

storing, at the server environment, a database of code assist information related to the software development project;

determining, by the server environment, a subset of the database of code assist information for sending to the client device, wherein the determining is based at least in part upon code classes utilized by the software development project, custom code names utilized by the software development project and which code files of the software development project are currently open within the online IDE;

and sending, by the server environment to the client device, the subset of the database of code assist information, wherein the subset of the database of code assist information is stored by the client device and used by the client device for local code assist operations at the client device, wherein the local code assist operations at the client device do not involve communication between the client device and the server environment when the local code assist operations can be performed using the subset of the database of code assist information stored by the client device.

2. The method of claim 1 wherein the subset of the database of code assist information comprises class names and data member names.

3. The method of claim 1 wherein the subset of the database of code assist information comprises class names, method names, and variable names.

4. The method of claim 1 wherein the subset of the database of code assist information is used for client-side code completion while the user of the client device is entering code.

5. The method of claim 1 wherein the subset of the database of code assist information is stored by the client device using HyperText Markup Language version 5 (HTML5) local web storage.

6. The method of claim 1 wherein the software development project is a Java software development project, and wherein the database of code assist information comprises Java package, class, and method information.

7. A server system for providing code assist within an online integrated development environment (IDE), the server system comprising:

a processing unit;

a memory; and a computer-readable medium storing computer executable instructions implementing the online IDE which, when executed by the server system, causes the server system to perform operations comprising:

receiving, from a client device, a request to access a software development project within the online IDE, wherein the online IDE is accessed by the client device using only a web browser;

storing a database of code assist information related to the software development project;

determining a subset of the database of code assist information based at least in part upon code classes utilized by the software development project custom code names utilized by the software development project and which code files of the software development project are currently open within the online IDE; and sending, to the client device, the subset of the database of code assist information, wherein the subset of the database of code assist information is stored by the client device and used by the client device for local code assist operations at the client device, wherein the local code assist operations at the client device do not involve communication between the client device and the server system when the local code assist operations can be performed using the subset of the database of code assist information stored by the client device.

8. The server system of claim 7 wherein the subset of the database of code assist information comprises class names, method names, and variable names.

9. The server system of claim 7 wherein the subset of the database of code assist information is used for client-side code completion while the user of the client device is entering code.

10. The server system of claim 7 wherein the subset of the database of code assist information is stored by the client device using HyperText Markup Language version 5 (HTML5) local web storage.

11. The server system of claim 7 wherein the software development project is a Java software development project, and wherein the database of code assist information comprises Java package, class, and method information.

12. A method for using code assist within an online integrated development environment (IDE), the method comprising:

sending, by a client computing device to a server computer, a request to access a software development project within the online IDE, wherein the online IDE is accessed via a web browser running on the client computing device;

receiving, by the client computing device from the server computer, a set of code assist information related to the software development project, the set of code assist information having been determined by the server computer to be related to the software development project based at least in part on code classes utilized by the software development project, custom code names utilized by the software development project and which code files of the software development project are currently open within the online IDE, and wherein the set of code assist information is a subset of a database of code assist information;

storing, by the client computing device in local storage, the received code assist information; and using, by the client computing device, the received and locally-stored code assist information for code assist operations at the client computing device, wherein the code assist operations at the client computing device do not involve communication between the client computing device and the server computer when the code assist operations can be performed using the locally-stored code assist information.

13. The method of claim 12 wherein the code assist information comprises class names and data member names.

14. The method of claim 12 wherein the code assist information comprises class names, method names, and variable names.

15. The method of claim 12 wherein the using the received and locally-stored code assist information comprises:

displaying, by the client computing device, a code assist selection based on the locally-stored code assist information while the user of the client computing device is entering code.

16. The method of claim 12 wherein the code assist information is stored by the client computing device HyperText Markup Language version 5 (HTML5) local web storage.

17. The method of claim 12 wherein the software development project is a Java software development project, and wherein the code assist information comprises Java package, class, and method information.

* * * * *